Oct. 28, 1947. M. L. HARTMANN 2,429,756
BREAD SLICE HALVING DEVICE
Filed Sept. 17, 1945 2 Sheets-Sheet 1

INVENTOR

Oct. 28, 1947. M. L. HARTMANN 2,429,756
BREAD SLICE HALVING DEVICE
Filed Sept. 17, 1945 2 Sheets-Sheet 2
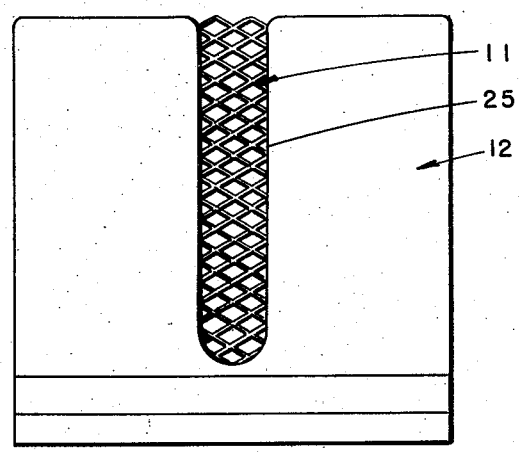
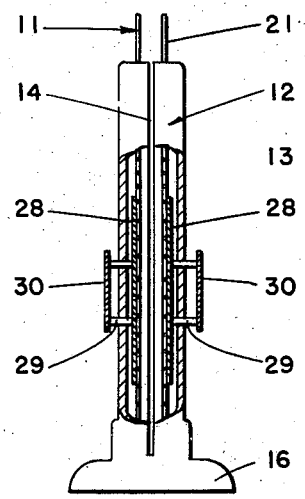
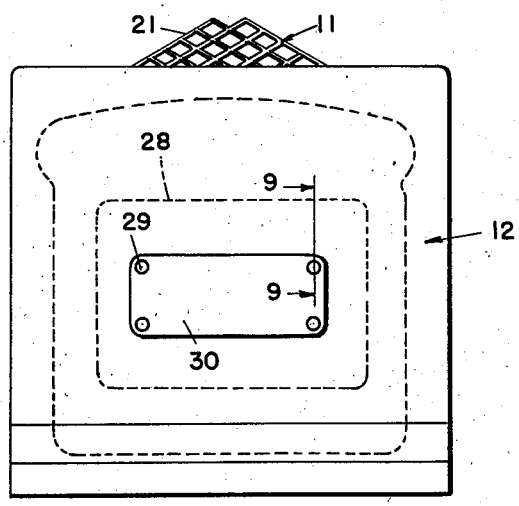
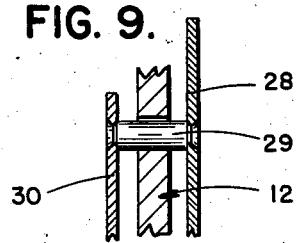
INVENTOR Patented Oct. 28, 1947

2,429,756

UNITED STATES PATENT OFFICE 2,429,756

BREAD SLICE HALVING DEVICE

Miner L. Hartmann, Beverly Hills, Calif.

Application September 17, 1945, Serial No. 616,859

4 Claims. (Cl. 146—150)

This invention relates to a bread-slicer for re-slicing ready sliced bread.

One object of the invention is to provide means for holding a slice of bread of ordinary thickness so that it may be re-sliced to form thin slices suitable for the making of sandwiches, melba toast, and the like. Another object is to provide a simple holder for a slice of bread which positions the slice for re-slicing by means of a knife guided in properly positioned guide slots. Another object is to provide a bread re-slicer which is simple in construction and easily cleaned. These and other objects are attained by my invention which will be described below, reference being made to the accompanying drawings in which:

Fig. 6 is a side elevational view showing another form of my re-slicer;

Fig. 7 is a side elevational view showing still another form of my re-slicer;

Fig. 8 is an end elevational view partly in section of the form of my re-slicer shown in Fig. 7;

Fig. 9 is a cross-sectional view taken on the line 9—9 of Fig. 7.

Figure 1:
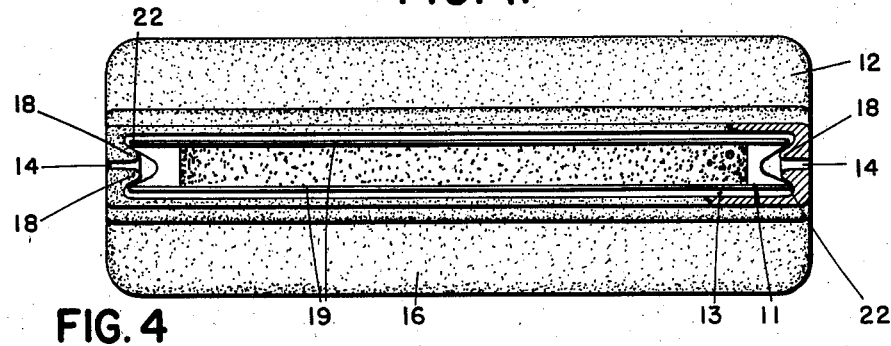
Fig. 1 is a top plan view of a preferred form of my bread re-slicer.
Figure 4:
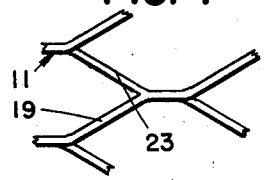
Fig. 4 is an enlarged fragmentary view showing one form of the grid used in the slice holder.

In general my re-slicer device consists of an envelope-like holder 11 for a slice of bread of the ordinary thickness, which is adapted to fit inside a cavity in a knife-guiding casing 12.

The casing 12 consists of an upright narrow compartment having a cavity 13 somewhat larger than a conventional slice of bread. The casing is conveniently made rectangular with narrow ends bifurcated to form the knife-guiding slits 14, which are conveniently provided with tapered openings at the top to facilitate the entry of the knife blade K, the knife-guiding slits 14 extending from the top to nearly the bottom of the casing for a distance somewhat greater than the maximum height of a conventional slice of bread. A widened base member 16 is provided, so that the device will stand upright. Inside the cavity 13, at the bottom thereof, in line with the knife-guiding slits, there is provided below the lower ends of the slits a centering groove 17 which is adapted to center the slice of bread contained in the slice holder so that the knife will bisect the slice. On the inside edges of the knife-guiding slits 14 are provided spacing beads or projections 18 which may extend the full length of the slits, or only in the upper portion, to facilitate the spacing or centering of the slice of bread in the upper part of the re-slicer, the beads acting as stop means for the side members of the slice holder 11. These beads are spaced apart to hold the sides of the slice holder apart for a width to accommodate the holding of a slice of bread of average thickness within the envelope holder 11.

The envelope holder 11 consists of two sheets or plates 19 of relatively stiff sheeted material, which may be metal, plastic, or other material, joined at the bottom to form an edge 20 fitting in the centering groove 17 of the base 16. The sides 19 of the holder are provided with handle means 21 extending above the top edge of the casing. The edges 22 of the side sheets 19 are adapted to fit between the inside wall of the casing and the spacing beads 18.

The envelope holder may be made of open metal either in the form of woven wire mesh or, as shown, of expanded metal lacing having sharp edges 23 which engage the surfaces of the slice of bread to hold it securely while it is being re-sliced. Other sheet material having bread-surface engaging projections such as metal provided with rough-edged punchings directed inwardly, or moulded plastic sheets have points or other projections, to engage the sides of the slice of bread to prevent it from moving during the re-slicing may be employed.

Figure 5:
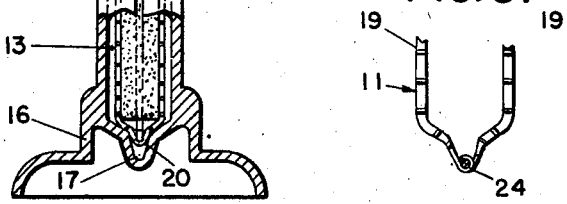
Fig. 5 is a fragmentary end view of a hinged modification of the slice holder.

The holder 11 is conveniently made of a single sheet of material bent in U-shape to conform to the size of a conventional slice of bread and with a narrow central portion forming a ridge 20 adapted to fit in the centering groove 17 in the base 16. Alternatively the two sheets of material constituting the envelope holder may be connected at the lower edge by the hinge 24 as shown in Fig. 5. The sheet of material forming the two sides of the holder is preferably bent so that it stands partly open when free, and is pressed together onto the sides of the head slice by the exertion of sufficient pressure to overcome the springiness of the bend.

The handle members 21 are conveniently made integrally with the side sheets by merely extending them upwardly, or they may be loop arrangements or tabs attached to the side sheets and arranged to avoid interfering with the insertion of the knife K in the center line of the top edge of the bread slice.

The operation of my device will be readily understood. The slice of bread of ordinary thickness is placed between the sides of the envelope holder 11 which is then inserted in the cavity 13 of the casing and the sides of the holder are drawn together at the top by the handles 21 until the edges 22 of the side sheets come in contact with the centering beads 18. The knife K is then inserted in the tapered openings 15 of the slits 14 to re-slice the bread slice in the holder, the knife being pressed downwardly with a reciprocating motion in the usual manner of slicing bread, while holding the handles together. The travel of the knife is stopped by striking the bottoms of the slits 14 in the casing which are above the bottom joined portion of the holder. After the knife has cut through the slice of bread, it may be withdrawn and the two thin slices are removed by lifting out the envelope holder and opening or spreading it for the removal of the thin slices. The hinged arrangement of Fig. 5 is particularly advantageous for easy removal of the thin slices of bread.

The side sheets of the envelope holder are made stiff enough to allow the secure holding of the slice of bread by means of the protruding handles 21 but is pliable enough so that additional pressure on the handles will permit holding a slice of bread which is slightly under the thickness determined by the positioning of the beads 18 at the sides of the device. If the slice of bread should be thicker than the average thickness provided for in the placing of the beads 18, then it may be held firmly by the pressure applied to the protruding handles.

The casing of my device is conveniently made by moulding from plastic material, although it may be shaped from sheet metal, by die-casting, or by other methods of forming.

Figure 2:
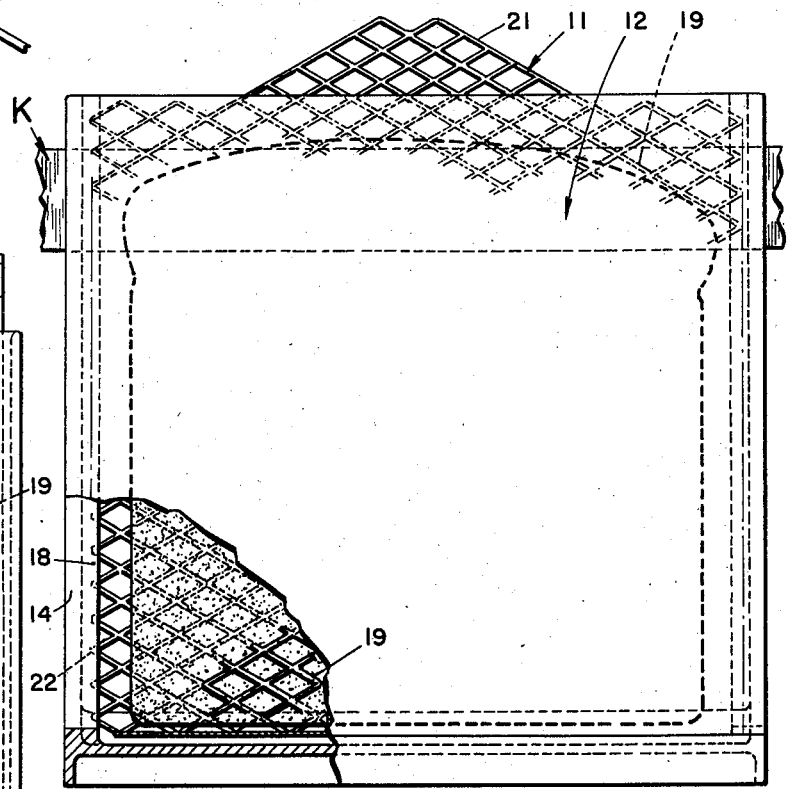
Fig. 2 is a side elevational view of the same with parts broken away to show interior structure.
Figure 3:
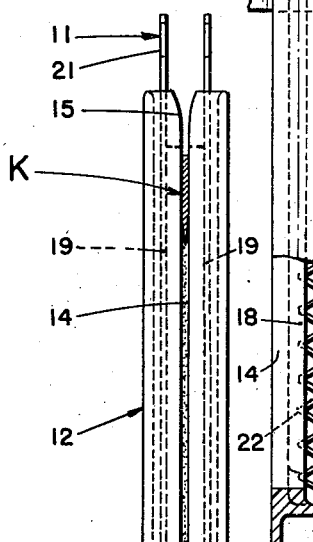
Fig. 3 is an end elevational view partly in section of the re-slicer of Figs. 1 and 2.

Modifications of my preferred structure may be employed. For example, in Fig. 6 is shown a simple form of my re-slicer which has a similar structure to that shown in Figs. 1 to 3, but modified by the elimination of the handles for the slice holder 11, and the provision of a finger slot 25 cut in the side walls of the casing 12 and extending down from the top edge, by which the sides of the holder may be pressed by the fingers against the sides of the bread slice during the re-slicing operation, and then subsequently used for grasping the holder to remove it from the cavity of the casing 12, and for subsequent removal of the thin bread slices.

Another modification is shown in Figs. 7 to 9. This is somewhat similar to the preferred form of Figs. 1-3, but has pressure plates 28 provided to act against the sides of the slice holder, to press these against the sides of the bread slice, to securely hold the bread while being re-sliced. The pressure plates 28 are actuated by pressure bars 30 outside the case 12, the pin members 29 connecting them, through corresponding holes in the sides of the casing.

The advantages of my re-slicing device are that it will accurately bisect a slice of bread to form the extra thin slices of bread which are so much desired for party sandwiches or for the making of melba toast; it is simple and economical to construct; it is easily kept clean; and is readily provided with a base wide enough to allow it to stand in an upright position. The envelope holder permits the removal of the two thin slices from the case, so that they may be removed without breaking or tearing. The structure is adaptable for use in re-slicing bread of varying thickness, within the range of the commonly sold slices of bread.

I claim:

1. A bread slice re-slicer comprising an upright non-opening casing having an open slot in the upper face leading to a cavity larger than a conventional slice of break, knife-guiding slits in the ends of said casing corresponding to the edges of the bread slice, and a centering groove at the bottom of said cavity; and an envelope-like bread slice holder having two bread-slice-engaging rigid sheets hingedly joined at the bottom to form a ridge coacting with the groove in the casing member to center the holder and its contained slice of bread edgewise between the said slits, means for manually holding the said sheets against the bread slice, and means for manually removing the envelope holder with the re-sliced bread slices.

2. A bread slice re-slicer comprising an upright open-top casing having a cavity larger than a conventional slice of bread, knife-guiding slits in the ends of the casing corresponding to the edges of the bread slice, spacing beads adjacent the inside edges of said slits, and a centering groove at the bottom of said cavity; and an envelope-like break slice holder having two bread-slice-engaging sheets joined at the bottom to form a ridge coacting with the groove in the casing member to center the holder and its contained slice of bread edgewise between the said slits, the edges of said sheets extending within the cavity to engage the spacing beads adjacent the slits in the casing, and handle means on said sheets for manually holding the said sheets against the bread slice and for removing the envelope holder with the re-sliced bread slices.

3. A bread slice re-slicer comprising an upright open-top casing having a cavity larger than a conventional slice of bread, knife-guiding slits in the ends of the casing corresponding to the edges of the bread slice, spacing beads adjacent the inside edges of the said slits, and a centering groove at the bottom of said cavity; and an envelope-like bread slice holder having two bread-slice-engaging sheets joined at the bottom to form a ridge coacting with the groove in the casing member to center the holder and its contained slice of bread edgewise between said slits, the edges of said sheets extending within the cavity to engage said spacing beads in the casing, and openings in the sides of said casing through which to manually hold the said sheets against the bread slice and for taking hold of the envelope holder to remove it with the re-sliced bread slices from said casing.

4. A bread slice re-slicer comprising an upright open-top casing having a cavity larger than a conventional slice of bread, knife-guiding slits in the ends of the casing corresponding to the edges of the bread slice, spacing beads adjacent the inside edges adjoining the said slits, and a centering groove at the bottom of said cavity; and an envelope-like bread slice holder having two bread-slice-engaging sheets joined at the bottom to form a ridge coacting with the groove in the casing member to center the holder and its contained slice of bread edgewise between said slits, the edges of said sheets extending within the cavity to engage said spacing beads adjacent the slits in the casing, handle means on said holder for removing the holder containing the re-sliced bread slices from the casing, and means for holding the bread-engaging sheets against the bread slice consisting of pressure plates inside the cavity of the casing against the central area of the said sheets, manual pressing bars outside the casing sides, and pin members through holes in the casing sides connecting the said inside pressure plates to the outside pressure bars.

MINER L. HARTMANN.

REFERENCES CITED

The following references are of record in the file of this patent:

UNITED STATES PATENTS

| Number | Name | Date |
|---|---|---|
| 2,159,945 | Wilson | May 23, 1939 |
| 2,172,538 | Katzinger | Sept. 12, 1931 |
| 2,206,154 | Bixler | July 2, 1940 |